United States Patent [19]

Knoell

[11] E Re. 29,940

[45] Reissued Mar. 20, 1979

[54] APPARATUS FOR LINING CARTONS

[75] Inventor: Lawrence H. Knoell, Maiden Rock, Wis.

[73] Assignee: Champion International Corporation, Stamford, Conn.

[21] Appl. No.: 869,159

[22] Filed: Jan. 13, 1978

Related U.S. Patent Documents

Reissue of:

[64] Patent No.: 3,932,105
Issued: Jan. 13, 1976
Appl. No.: 582,291
Filed: May 30, 1975

U.S. Applications:

[62] Division of Ser. No. 506,945, Sep. 18, 1974, abandoned.

[51] Int. Cl.[2] ..... B29C 17/04; B29D 3/02
[52] U.S. Cl. ..... 425/504; 425/515
[58] Field of Search ..... 425/504, 515

[56] References Cited

U.S. PATENT DOCUMENTS

| | | | |
|---|---|---|---|
| 3,445,892 | 5/1969 | Amberg et al. | 425/504 |
| 3,453,162 | 7/1969 | Turner | 425/504 X |
| 3,577,700 | 5/1971 | Bippus et al. | 425/504 X |
| 3,875,280 | 4/1975 | Story | 425/504 X |

*Primary Examiner*—J. Howard Flint, Jr.
*Attorney, Agent, or Firm*—Evelyn M. Sommer

[57] ABSTRACT

Equipment and process for lining an assembled carton tray made from foldable paperboard or similar material with a [thermo-plastic] *thermoplastic* film by use of a vacuum applied in a recessed mold containing the tray. The tray and mold are moved beneath a sheet of film which is heated or a hot sheet of film extruded over the top of the tray. The film must be severed around the edges of the tray after the lining is drawn. A tray may be used with the lid laid back so that the inner facing surface of the lid is also coated with the film. In so doing, a later seal may be formed between the lid and the tray or use of the two films contacting around the edges of the tray.

10 Claims, 16 Drawing Figures

APPARATUS FOR LINING CARTONS

Matter enclosed in heavy brackets [ ] appears in the original patent but forms no part of this reissue specification; matter printed in italics indicates the additions made by reissue.

This application is *a Reissue of Patent No. 3,932,105, which is* a division of *application* Ser. No. 506,945, filed Sept. 18, 1974, *now abandoned.*

BACKGROUND OF THE INVENTION

1. Field of the Invention

This invention relates generally to the lining of paper receptacles, and more particularly to the use of sheet or extruded films placed over an assembled carton and vacuum drawn into contiguous relationship with the bottom and sides of the receptacle.

2. Description of the Prior Art

There are many applications in the art which call for receptacles having a surface which incorporates a barrier of some sort. Since paperboard is a readily useable and relatively inexpensive medium, the use of coated and laminated paperboard has been common for some time in making boxes and trays. However, when paperboard is used which is coated or laminated prior to folding or cutting, the resulting side seams and corner flaps have a greater tendancy to leak or wick since the scores and folds are areas of stress and they are inclined to crack and leak during cutting, scoring, and/or folding. The use of solid plastic materials to make unsupported trays or boxes results in a container having side walls much thicker than is required for purposes of the barrier characteristics, and much thinner wall thicknesses can be used if they are in combination with a paperboard structure. Bag in a box packages, however, require separate handling and sealing of the bag, and these packages usually waste some space because the bag does not conform well to the inside corners of the paperboard structure.

SUMMARY OF THE INVENTION

An assembled paperboard carton tray is placed on a conveyor and advanced underneath either an extruded sheet of film or a conventional sheet of [thermo-plastic] *thermoplastic* film which is then heated, the tray and mold are then introduced to a [vacuum] station which [draws] *deforms* the film down into contiguous relationship with the entire inner surfaces of the carton tray, and the tray is then separated from the surrounding film not in contact with the edges of the tray.

DESCRIPTION OF THE PREFERRED EMBODIMENT

Figure 1:
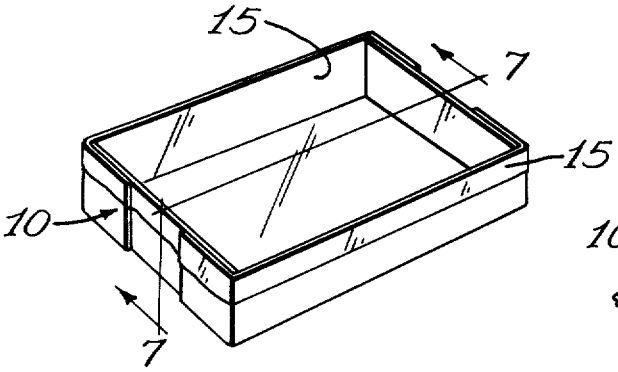
FIG. 1 is a perspective view of a carton tray lined in accordance with the present invention.

The present invention provides novel equipment for producing a carton tray such as shown in FIG. 1 with a continuous liner of [thermo-plastic] *thermoplastic* film. Since in some applications the incidental mechanical adhesion between the film and paperboard from which the carton tray is made will provide sufficient adhesion to keep the liner in place, no special provisions may be made for additional adhesive. It should be understood, however, that the inside of the carton tray may be provided with a [thermo-plastic] *thermoplastic* coating to provide chemical bonding between the film and paperboard. As can be seen in FIG. 1 the carton tray 10 is assembled by any conventional means prior to lining. The liner 15 closely assumes the inside configuration of the sides and bottom 12 of the tray 10, as well as overlapping the top edges of the tray 10.

Figure 2:
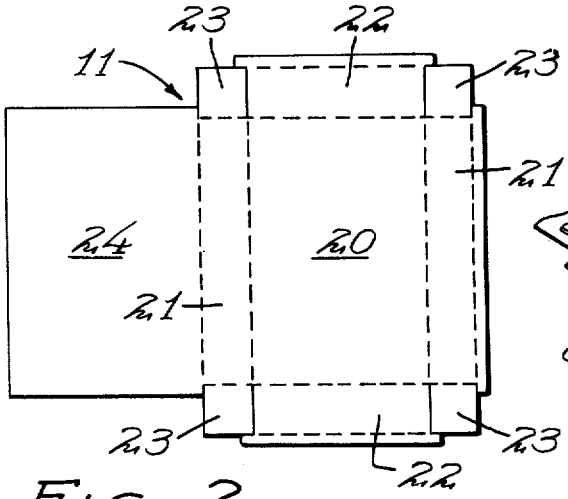
FIG. 2 is a plan view of a carton tray blank adapted to be folded into a carton tray having flange edges suitable for use with the present invention.

FIG. 2 illustrates a typical carton tray blank 11 which may be used in such a process, but it should be understood that the possible carton designs which may be employed are almost limitless. The blank includes a bottom panel 20, side and end wall panels 21 and 22 respectively and wrap-around corner flaps hingedly connected to the opposite ends of the side panels 21 designated as 23. The tray may or may not be constructed with a top cover panel 24, the significance of this top cover panel in the process to be described later. This style tray 11 is provided with a narrow flange for sealing which will be described later. As previously mentioned, it is common in the art to take the blank in this form and laminate a film to it or apply a barrier coating on it prior to folding into its final configuration. The scoring and bending, however sometimes weakens this barrier and increases chances of failure.

Figure 4:
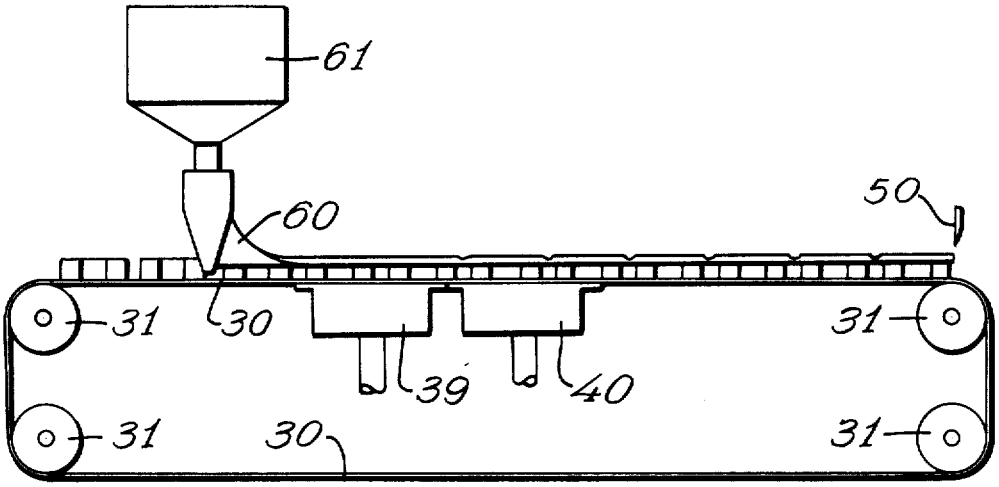
FIG. 4 is a side elevation view of an alternative form of apparatus similarly embodying the present invention.
Figure 3:
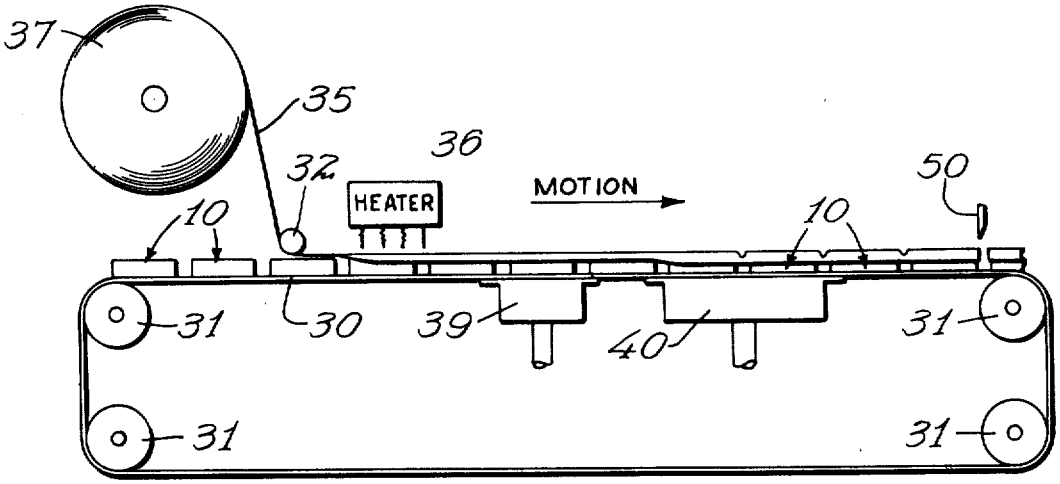
FIG. 3 is a side elevation view of apparatus embodying the present invention.

FIGS. 3 and 4 show alternate forms of equipment which may be used to practice the present invention.

The apparatus in FIG. 3 includes a conveyor 30 which is continuous and advanced by support rollers 31 located to provide tension and motion. The trays 10 are loaded at one end of the conveyor in close relationship in the assembled state. They advanced in ordered relationship beyond a roller 32 which locates a sheet of film 35 directly over the tops of the carton trays 10 as it is unwound from a storage spool 36. The cartons 10 and film 35 are then advanced at an uniform speed beneath any means common in the art for heating the film to soften it. The heater is shown as 36 and since the film is of the [thermo-plastic] *thermoplastic* type it is ready to be formed after leaving the vicinity of the heater 36. The advancing cartons 10 and film 35 are then presented to means for drawing the film down into contiguous relationship with the interior surfaces of the carton tray 10, this means being shown in FIG. 3 as a pair of vacuum positions beneath the conveyor 30.

It should be remembered that the paperboard from which the cartons are made is porous and allows a vacuum to be drawn therethrough from the bottom panel of the carton. Two vacuum stations 39 and 40 are shown but it may be possible to eliminate the preliminary vacuum station 39 and accomplish the entire drawing process at one station only. Those skilled in the art will appreciate that the relative dimensions of depth and area in the tray 10 can affect the ability of the system to draw the [thermo-plastic] *thermoplastic* film down inside the carton tray 10. Also the thickness of film 35 desired and the potential rate at which it may be heated by the heater 36 will play a part in determining the vacuum sequence and [perameters] *parameters*.

The film 35 is pulled down over the outside edge of the tray 10 as well and to some extent, sags over the outside edges as a result of the heating. When the trays and liners reach the opposite end of the conveyor 30 they are separated by some standard means such as knife or sliter shown generally in FIG. 3 as 50.

In FIG. 4 an alternate embodiment is shown and for convenience similar parts will have assigned similar numbers including the conveyor 30, conveyor rollers 31, preassembled cartons 10 located on the conveyor and the vacuum stations 39 and 40 which are connected to a source of negative pressure and finally the means for severing the cartons after completion 50. This embodiment employs an extruder such as those manufactured by the Possis Corporation of Minneapolis, Minn., and described in U.S. Pat. No. 3,596,432 to Straub issued Aug. 3, 1971. The cartons 10 are moved beneath the cascading sheet of molten plastic film labeled 60 being extruded from the extrusion apparatus commonly labeled 61. [since] *Since* the film is relatively hot no preheating is necessary before applying the vacuum to the cartons.

Figure 5:
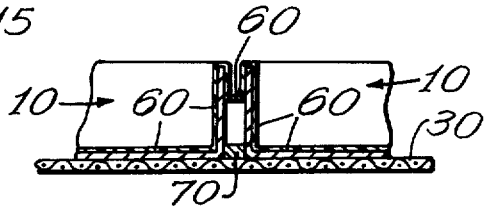
FIG. 5 is a cross sectional elevation view showing the relationship of adjacent trays after the lining process but before separation.

Because it is not feasible to operate the apparatus described in FIG. 4 in an intermittent motion manner, since to do so would create uneven distribution of the film which must be continuously extruded, the carton trays 10 are moved into the regions of vacuum such that the advancing part of the carton tray 10 is exposed to vacuum before the entire bottom surface 20 can be exposed to the vacuum. Also, there must be some spacing between adjacent carton trays 10 on the conveyor 30 and in order to prevent vacuum leakage in this spacing it is necessary as shown in FIG. 5 to put a spacer bar 70 which assures an even spacing between the cartons and reduces the vacuum leakage from between the carton trays 10. It is desireable of course, that the film 60 extend down the outside edges of the tray 10 to assure a proper seal.

Figure 6:
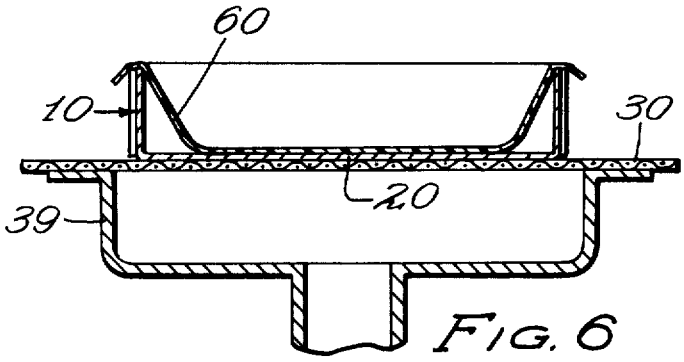
FIG. 6 is a side elevation view in section of a portion of the apparatus shown in FIGS. 3 and 4, showing the liner in partially formed condition.
Figure 7:
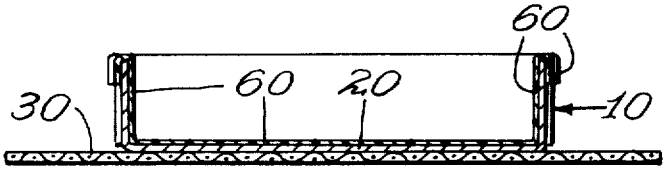
FIG. 7 is an elevational sectional view of the fully formed lined carton tray shown in FIG. 1 taken along section line 7—7.

FIG. 6 illustrates the general configuration of film in the carton while located over the first vacuum station. It is anticipated that this first vacuum station 39 should only partially expand the film 60 in order to distribute it so that the second and final vacuum station 40 can completely draw the film into conforming relationship and not, at the same time, create unnecessary thinning or weakening of the film 60 especially in the corners. FIG. 6 shows only a single tray 10, and it should be noted that depending on the environment in which this operation is conducted, that additional reheating stations might be necessary above the film prior to drawing the final vacuum at station 40 to insure the film 60 is of the proper workable viscosity. As can be seen in FIG. 6 it is best to have a vacuum station which covers nearly all the surface area of the bottom of the tray 20. FIG. 7 shows in cross section a completed and lined tray severed from adjacent trays 10 with the lining in place contiguous with the entire inner surface of the tray 10 and overlapping the top edges.

Figure 8:
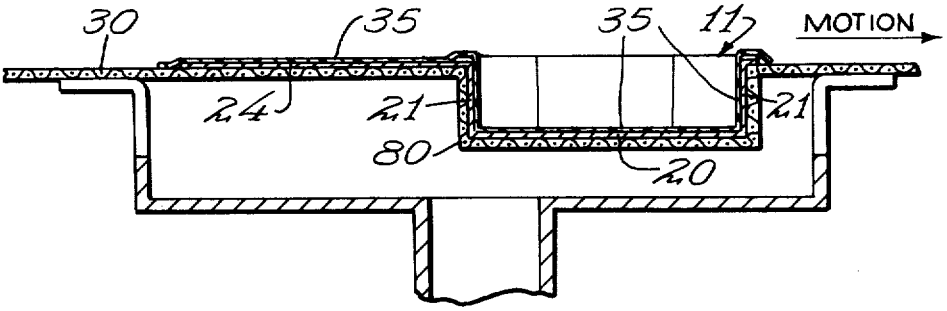
FIG. 8 is a sectional elevation view of an alternative configuration embodying a recessed tray holder employed in the conveyor.

FIG. 8 shows an alternate embodiment of a recessed mold located at one of the two vacuum stations which would allow the film to be drawn not only against the bottom of the carton tray 20 but also against the sides. In other words, the carton is subjected to vacuum on all sides by recessing it in the mold 80 which is made of porous material similar to the rest of the conveyor 30. The film is deposited on top of the carton tray 10 in either of the two methods shown in FIG. 3 and FIG. 4 and a means must be provided to seal the vacuum chambers 39 and 40 so that while the mold 80 is spaced therein, the vacuum will not be allowed to leak but will be directed at the carton tray 10. The particular carton shown has a lid 24 connected thereto and spaced in flush relation against the surface of the conveyor 30. The film 35 or 60 is shown completely drawn into contiguous relation with the inner surface of the tray 10 and the surface of the lid 24.

Figure 14:
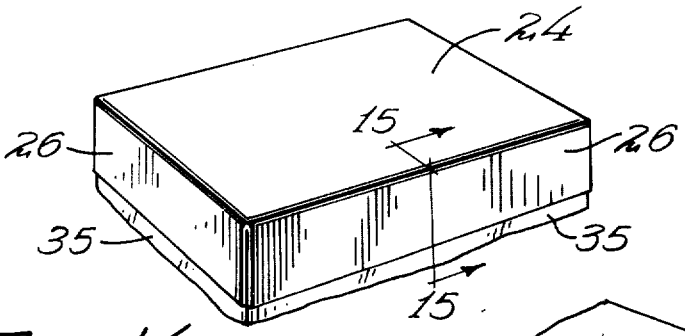
FIG. 14 shows a completely sealed carton with lid.
Figure 9:
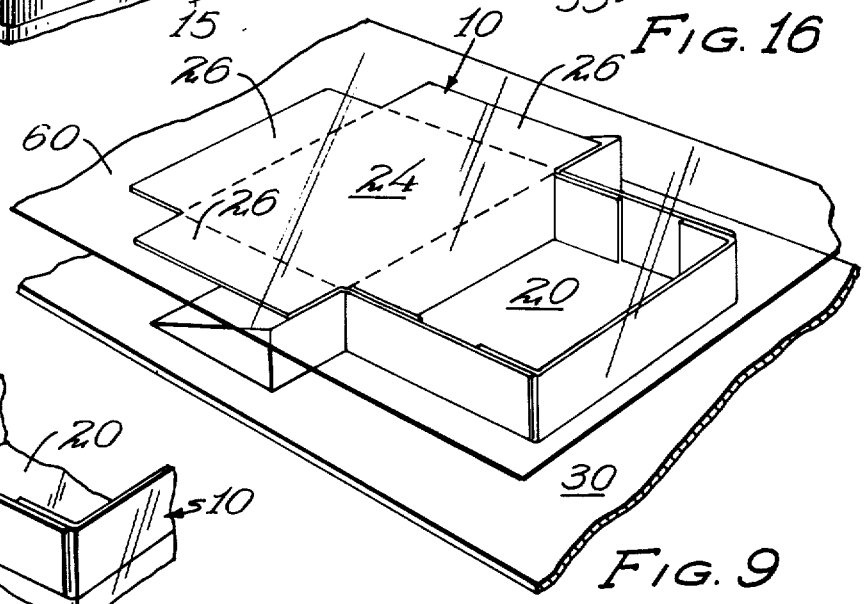
FIG. 9 is a perspective view of a carton tray including a lid shown prior to the lining.
Figure 13:
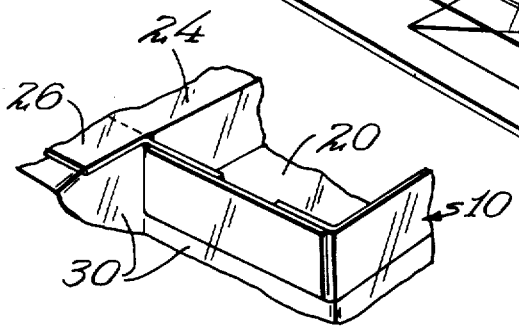
FIG. 13 is a partial section shown in perspective of the carton tray of FIG. 9 after processing.
Figure 11:
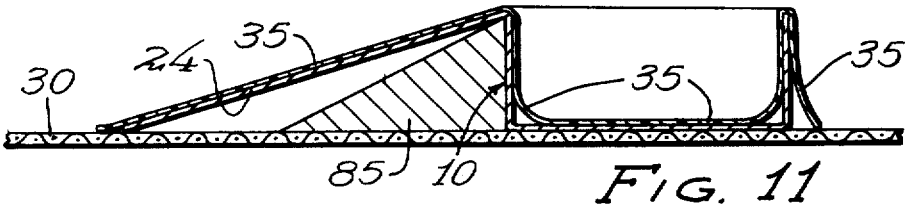
FIG. 11 is a cross section elevation view of the carton tray shown in FIG. 9 with the lining partially drawn into place.
Figure 12:
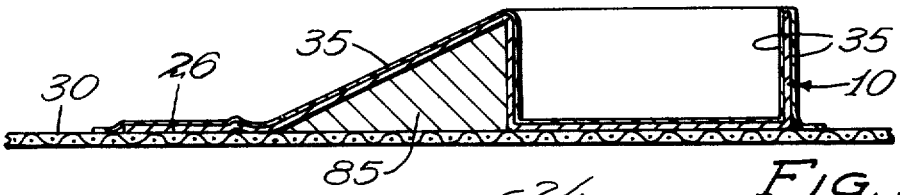
FIG. 12 is a cross section elevation view of the carton tray shown in FIG. 9 with the lining completely in place.
Figure 15:
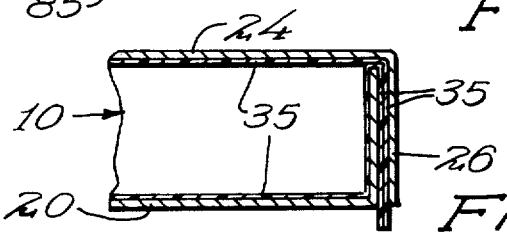
FIG. 15 is a cross section elevation view of a portion of the completed carton shown in FIG. 14, taken along section line 15—15.

FIGS. 9, 11 and 12 show an embodiment which allows a carton 10 having a lid 24 to be used on a flat conveyor such as originally described in FIGS. 3 and 4. A wedge shaped support 85 located in abutting relation to the side wall of the carton 10 adjacent to the hinged top cover 24, and provides support for the top cover 24 yet also includes porosity or other means for conducting the vacuum to the surface of the top 24. Thus when the carton tray 10 is moved beneath the film depositing means be it extrusion or roll type, the film is deposited on the top 24 as well and when the vacuum is drawn in the later operations, the film is closely adhered to the top 24 as well as the remainder of the carton 10. A portion of this finished lined container with lid is shown in FIG. 13, and the desireability of this type of method is that the top may then be folded over the remainder of the open tray and if heat sealed in such a manner as to fuse the [thermo-plastic] *thermoplastic* films adhered to both the tray 10 and the top 24, the completely sealed package results, as seen in FIGS. 14 and 15 clearly shows how the contents would be completely surrounded and sealed by the film barrier after such a closing step is accomplished.

Figure 10:
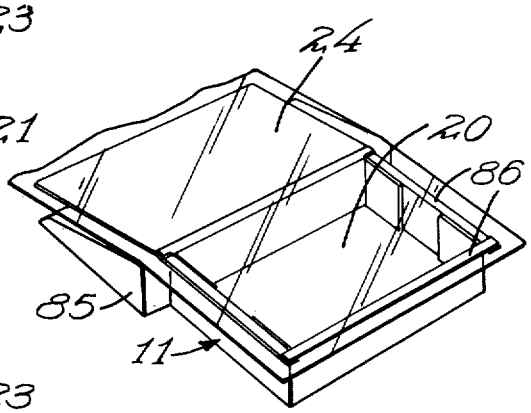
FIG. 10 is a perspective view of the blank in FIG. 2 assembled with a sheet of film draped over its top to show how the flange may be used to seal the film to the carton.

As previously mentioned there are almost no limits to the number of designs which may be employed in the present invention. The carton 11 shown in FIG. 10 is noteworthy since the flange 86 around its edges makes it easy to trim the excess film from around it and also to seal a cover or lid thereto. By contrast the simpler style carton 10 in FIG. 1 must be trimmed with the film draped over its edges after vacuum forming.

Figure 16:
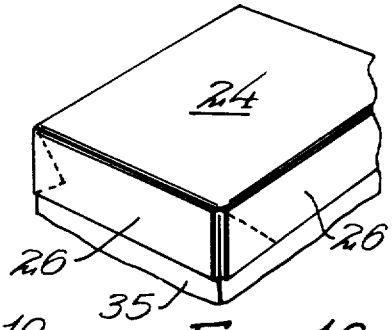
FIG. 16 is a perspective of the carton in FIG. 14 showing in dashed lines how the film is folded to permit the top to be folded down.

When a cover is added, however, as in FIGS. 11 through 16 to a conventional tray 10 with no flange the tray 10 is processed with the lid and lid flaps 26 in flat relationship so they are coated with film 35. Thus the sides of the tray 10 have film draped down their outer surfaces and when the lid 24 is brought down the flaps 25, each coated with film 35, contact the tray to permit a film to film seal to be made by applying heat or other suitable means. FIG. 16 shows how the excess film 35 in the corners of the assembled tray lid must be folded in or gusseted as shown by the dashed lines.

Any of the cartons described can be processed after filling through a similar operation without the application of vacuum to give a sealed cover of film which may be attached around the periphery of the carton by a film-to-film seal with the film making up the liner.

It should also be understood that in certain configurations it may be desirable to use positive air pressure from above to help the film assume the proper shape in the carton, either alone or in combination with vacuum from beneath the carton. Although it would require more sophisticated mechanical apparatus which is not shown it could also be possible to use contacting plunger or plug means for engaging the film and forcing it into conformity with the inside of the carton. It is felt in nearly all applications the use of vacuum alone will be sufficient.

In accordance with the Patent Statutes, I have described the principles of construction and operation of my improvement in APPARATUS FOR LINING CARTONS; and while I have endeavored to set forth the best embodiment thereof, I desire to have it understood that obvious changes may be made within the scope of the following claims without departing from the spirit of my invention.

I claim:

1. Apparatus adapted to line a tray having a flat bottom and upright side walls made from foldable paperboard or similar sheet-like material with a continuous strip of [thermo-plastic] *thermoplastic* film, comprising:

continuous conveyor means for holding a plurality of said trays in close spaced relationship;

means for advancing said trays and said conveyor;

means for dispensing a continuous strip of said [thermo-plastic] *thermoplastic* film into juxtaposition above said trays on said conveyor;

means positioned beneath said conveyor for pulling a vacuum through the bottom of said tray which can pull down that portion of said film directly above said tray into contiguous conforming relationship with the inside surfaces of said tray; and means for separating said tray and contiguous conforming portion of said film from that film positioned between adjacent trays and not in contact therewith.

2. The apparatus of claim 1 including means for heating said [thermo-plastic] *thermoplastic* film prior to pulling a vacuum through the bottom of said tray.

3. The apparatus of claim 1 including a second preliminary vacuum means for partially drawing said [thermo-plastic] *thermoplastic* film into said tray.

4. The apparatus of claim 1 wherein said means for dispensing film comprises extrusion means for extruding a continuous strip of heated [thermo-plastic] *thermoplastic* film.

5. The apparatus of claim 1 including mold recesses formed within said conveyor to allow vacuum to be pulled through the sides as well as the bottom of said tray.

*6. Apparatus adapted to line a tray having a bottom wall and side walls made from foldable paperboard or similar sheet-like material with a continuous strip of thermoplastic film, comprising:*

*conveyor means for holding a plurality of said trays;*

*means for driving said conveyor to advance said trays;*

*means for dispensing a continuous strip of said thermoplastic film into position above said trays;*

*means for deforming that portion of the film directly above said tray into contiguous conforming relationship with the inside surfaces of said tray; and*

*means for separating said tray and contiguous conforming portion of said film from film positioned between adjacent trays and not in contact therewith.*

*7. The apparatus of claim 6 wherein said deforming means includes means for creating a vacuum to pull down that portion of said film which is above said tray.*

*8. The apparatus of claim 6 including means for heating said thermoplastic film before it is deformed by said deforming means.*

*9. The apparatus of claim 7 including mold recesses formed within said conveyor to allow vacuum to be pulled through the sides as well as the bottom of said tray.*

*10. The apparatus of claim 8 wherein said means for dispensing film comprises extrusion means for extruding a continuous strip of thermoplastic film.*

* * * * *